United States Patent
Zhao

(10) Patent No.: US 7,554,651 B2
(45) Date of Patent: Jun. 30, 2009

(54) LASER DISTANCE FINDER

(75) Inventor: Yuzhong Zhao, Nanjing (CN)

(73) Assignee: Chevron Limited, Hong Kong (HK)

( * ) Notice: Subject to any disclaimer, the term of this patent is extended or adjusted under 35 U.S.C. 154(b) by 58 days.

(21) Appl. No.: 12/006,567

(22) Filed: Jan. 3, 2008

(65) Prior Publication Data

US 2008/0174761 A1 Jul. 24, 2008

(30) Foreign Application Priority Data

Jan. 19, 2007 (CN) .................. 2007 2 0033619 U

(51) Int. Cl.
*G01C 3/08* (2006.01)
(52) U.S. Cl. ..................... 356/4.01; 356/5.01
(58) Field of Classification Search ....... 356/4.01–5.15, 356/28

See application file for complete search history.

(56) References Cited

U.S. PATENT DOCUMENTS

| | | | |
|---|---|---|---|
| 3,691,850 A | 9/1972 | Slater et al. |
| 3,759,616 A | 9/1973 | Hildebrand |
| 4,247,809 A | 1/1981 | Nessel |
| 4,676,103 A | 6/1987 | Nakajima |
| 4,718,171 A | 1/1988 | Schlemmer et al. |
| 4,751,782 A | 6/1988 | Ammann |
| 4,781,457 A | 11/1988 | Hirano et al. |
| 4,830,489 A | 5/1989 | Cain et al. |
| 4,852,265 A | 8/1989 | Rando et al. |
| 4,854,703 A | 8/1989 | Ammann |
| 4,912,851 A | 4/1990 | Rando et al. |
| 4,993,161 A | 2/1991 | Borkovitz |
| 5,063,679 A | 11/1991 | Schwandt |
| 5,075,977 A | 12/1991 | Rando |
| 5,144,487 A | 9/1992 | Hersey |
| 5,148,018 A | 9/1992 | Ammann |
| 5,182,863 A | 2/1993 | Rando |
| 5,218,770 A | 6/1993 | Toga |
| 5,287,627 A | 2/1994 | Rando |
| D348,227 S | 6/1994 | Nielsen et al. |
| 5,331,395 A | 7/1994 | Piske et al. |
| 5,367,779 A | 11/1994 | Lee |
| 5,400,514 A | 3/1995 | Imbrie et al. |
| 5,446,635 A | 8/1995 | Jehn |
| D363,240 S | 10/1995 | Hirakawa et al. |

(Continued)

FOREIGN PATENT DOCUMENTS

CA 2300241 9/2000

(Continued)

*Primary Examiner*—Isam Alsomiri
(74) *Attorney, Agent, or Firm*—McDermott Will & Emery LLP

(57) ABSTRACT

A laser distance finder including a laser generating device, a collimating lens positioned in an emitting end direction of the laser generating device, a receiving lens for receiving a reflected measuring beam from an object to be measured and focusing it into an image, an optoelectronic detector disposed in the distance finder, a reflective member rotatably mounted on an optical path of the collimating measuring beam via a rotating shaft and being capable of rotating to a first position and a second position around the rotating shaft, which is connected to an output shaft of a motor. The laser distance finder further includes a spring, and the reflective member that rotates to a desired position rapidly and exactly by utilizing various deformation status of the spring, thus saving power.

10 Claims, 1 Drawing Sheet

U.S. PATENT DOCUMENTS

| | | |
|---|---|---|
| 5,459,932 A | 10/1995 | Rando et al. |
| 5,485,266 A | 1/1996 | Hirano et al. |
| 5,500,524 A | 3/1996 | Rando |
| 5,519,942 A | 5/1996 | Webb |
| 5,524,352 A | 6/1996 | Rando et al. |
| D371,309 S | 7/1996 | Webb |
| 5,531,031 A | 7/1996 | Green |
| 5,539,990 A | 7/1996 | Le |
| 5,541,727 A | 7/1996 | Rando et al. |
| 5,561,911 A | 10/1996 | Martin |
| 5,572,797 A | 11/1996 | Chase |
| D376,111 S | 12/1996 | Ishii |
| 5,581,034 A | 12/1996 | Dao et al. |
| 5,594,993 A | 1/1997 | Tager et al. |
| 5,604,987 A | 2/1997 | Cupp |
| 5,617,202 A | 4/1997 | Rando |
| 5,621,975 A | 4/1997 | Rando |
| 5,636,018 A | 6/1997 | Hirano et al. |
| D383,075 S | 9/1997 | Sawaguchi et al. |
| D389,758 S | 1/1998 | Motamed |
| 5,742,387 A | 4/1998 | Ammann |
| 5,745,623 A | 4/1998 | Ohtomo et al. |
| 5,754,582 A | 5/1998 | Dong |
| 5,760,932 A | 6/1998 | Perchak |
| 5,784,792 A | 7/1998 | Smith |
| D396,817 S | 8/1998 | Webb |
| D397,627 S | 9/1998 | Webb |
| D399,145 S | 10/1998 | Ho |
| 5,819,424 A | 10/1998 | Ohtomo et al. |
| 5,836,081 A | 11/1998 | Orosz, Jr. |
| 5,838,431 A | 11/1998 | Hara et al. |
| D402,218 S | 12/1998 | Kennison |
| 5,842,282 A | 12/1998 | Ting |
| 5,864,956 A | 2/1999 | Dong |
| 5,872,657 A | 2/1999 | Rando |
| 5,898,490 A | 4/1999 | Ohtomo et al. |
| D409,508 S | 5/1999 | Gallagher |
| D411,470 S | 6/1999 | Webb |
| 5,907,907 A | 6/1999 | Ohtomo et al. |
| 5,914,778 A | 6/1999 | Dong |
| D411,809 S | 7/1999 | Wakabayashi |
| D412,857 S | 8/1999 | Howard et al. |
| 5,946,087 A | 8/1999 | Kasori et al. |
| D415,436 S | 10/1999 | Martone |
| 5,960,551 A * | 10/1999 | Nishi et al. .................. 33/292 |
| 5,966,826 A | 10/1999 | Ho |
| D416,856 S | 11/1999 | Onose |
| 5,983,510 A | 11/1999 | Wu et al. |
| 5,992,029 A | 11/1999 | Dong |
| D417,633 S | 12/1999 | Sato et al. |
| 6,005,719 A | 12/1999 | Rando |
| D418,432 S | 1/2000 | Krantz |
| D418,433 S | 1/2000 | Krantz |
| D418,434 S | 1/2000 | Krantz |
| D418,763 S | 1/2000 | Krantz |
| 6,009,630 A | 1/2000 | Rando |
| 6,012,229 A | 1/2000 | Shino |
| 6,014,211 A | 1/2000 | Middleton et al. |
| D420,972 S | 2/2000 | Brecher et al. |
| 6,055,046 A | 4/2000 | Cain |
| 6,064,471 A * | 5/2000 | Nakagawa ................ 356/4.01 |
| 6,065,217 A | 5/2000 | Dong |
| 6,073,353 A | 6/2000 | Ohtomo et al. |
| D429,481 S | 8/2000 | Ishii |
| 6,133,996 A | 10/2000 | Plumb et al. |
| 6,151,106 A | 11/2000 | Ohtomo et al. |
| 6,151,787 A | 11/2000 | Wright et al. |
| 6,163,969 A | 12/2000 | Jan et al. |
| 6,167,630 B1 | 1/2001 | Webb |
| 6,178,649 B1 | 1/2001 | Wu |
| 6,184,979 B1 | 2/2001 | Hirano et al. |
| 6,195,902 B1 | 3/2001 | Jan et al. |
| 6,202,312 B1 | 3/2001 | Rando |
| 6,209,219 B1 | 4/2001 | Wakefield et al. |
| 6,222,625 B1 | 4/2001 | Johnston |
| 6,249,338 B1 | 6/2001 | Ohtomo et al. |
| 6,249,983 B1 | 6/2001 | Wright et al. |
| 6,262,801 B1 | 7/2001 | Shibuya et al. |
| 6,293,024 B1 | 9/2001 | Fiebig et al. |
| 6,351,890 B1 | 3/2002 | Williams |
| 6,360,446 B1 | 3/2002 | Bijawat et al. |
| D455,664 S | 4/2002 | Webb |
| D457,446 S | 5/2002 | Kallabis |
| 6,407,803 B1 | 6/2002 | Schrank |
| D460,924 S | 7/2002 | Hitchcock |
| D461,135 S | 8/2002 | Watson et al. |
| 6,427,348 B1 | 8/2002 | Webb |
| 6,430,823 B1 | 8/2002 | Seki |
| 6,449,856 B1 | 9/2002 | Matsumoto et al. |
| D464,578 S | 10/2002 | Zurwelle |
| 6,459,483 B1 | 10/2002 | Shafer et al. |
| 6,487,783 B1 | 12/2002 | Thomas, Jr. |
| 6,493,067 B1 | 12/2002 | Kodaira et al. |
| 6,493,955 B1 | 12/2002 | Moretti |
| D469,369 S | 1/2003 | Durkin |
| D469,556 S | 1/2003 | Malard et al. |
| D469,738 S | 2/2003 | Ishii |
| D470,423 S | 2/2003 | Loudenslager et al. |
| D470,424 S | 2/2003 | Hand et al. |
| 6,532,676 B2 | 3/2003 | Cunningham |
| 6,556,283 B2 | 4/2003 | Shirai et al. |
| D474,985 S | 5/2003 | Cooper et al. |
| D475,938 S | 6/2003 | Lopano |
| 6,577,388 B2 | 6/2003 | Kallabis |
| D476,584 S | 7/2003 | Zurwelle |
| 6,606,798 B2 | 8/2003 | El-Katcha |
| 6,735,879 B2 | 5/2004 | Malard et al. |
| 6,739,062 B2 | 5/2004 | Jan et al. |
| 6,829,834 B1 | 12/2004 | Krantz |
| 6,914,930 B2 | 7/2005 | Raskin et al. |
| 2002/0073561 A1 | 6/2002 | Liao |
| 2002/0166249 A1 | 11/2002 | Liao |
| 2002/0178596 A1 | 12/2002 | Malard |
| 2004/0123473 A1 | 7/2004 | Malard et al. |
| 2004/0187327 A1 | 9/2004 | Levine |
| 2005/0066533 A1 | 3/2005 | Wheeler et al. |
| 2005/0078303 A1 | 4/2005 | Murray |

FOREIGN PATENT DOCUMENTS

| | | |
|---|---|---|
| CN | 96209131.6 | 3/1998 |
| DE | 197 41 726 | 9/1997 |
| EP | 0 735 505 | 10/1996 |
| GB | 2 281 714 | 3/1995 |
| JP | 361100436 | 5/1986 |
| WO | WO 00/73989 | 12/2000 |
| WO | WO 01/13320 | 2/2001 |
| WO | WO 02/067190 A3 | 8/2002 |
| WO | WO 03/074970 | 9/2003 |

* cited by examiner

LASER DISTANCE FINDER

CROSS-REFERENCE TO RELATED APPLICATION

This application claims priority under 35 U.S.C. § 119 of Chinese Application 200720033619.8, filed Jan. 19, 2007, which is hereby incorporated by reference.

FIELD OF THE INVENTION

The present invention relates to a distance finder, and more particularly to a laser distance finder for distance measurement via using light waves.

BACKGROUND OF THE INVENTION

Laser distance finders have advantages of being convenient to use, having high accuracy, and short measuring time. Laser distance finders are widely used in a variety of applications, including architecture, exploration, construction and so on.

A known laser distance finder usually comprises a laser generating device, a collimating lens positioned at an emitting end of the laser generating device for converting a laser beam generated from the laser generating device into a collimating measuring beam, a receiving lens disposed on one side of the laser generating device for receiving a reflected measuring beam from an object to be measured and focusing it into an image, an optoelectronic detector disposed in the distance finder for receiving the image of the reflected measuring beam and converting optical signals therein into corresponding electrical signals which are processed to obtain a distance measuring result.

The distance measuring result derived from the electrical signals converted from the optical signals received by the optoelectronic detector contains a distance by which the measuring beam is transmitted in the distance finder. During distance measuring, accuracy of the measuring results is directly affected by drift errors of electrical signals transferred in circuit that are caused by self-heating of electronics elements of the circuit and environmental temperature influences. Therefore, an internal reference distance having a known length is provided in the distance finder to improve the measuring accuracy, and a reflective member is arranged in an optical path of the collimating measuring beam. When measuring an external distance, the reflective member is in a non-blocking position so that the collimating measuring beam is allowed to be projected out of the distance finder. When measuring the internal reference distance, the reflective member is in a blocking position to reflect the collimating measuring beam in the distance finder forming an internal optical path.

A button directly connected to the reflective member is provided in the conventional laser distance finder for a user to manually change the positions of the reflective member, which is inconvenient. In some other optical distance finders, a motor is provided to drive the reflective member to swivel, supplying power to provide current to the motor continuously so that the reflective means can be kept in a desired position when the reflective means is swiveled onto the desired position. Such an arrangement consumes a great deal of power and is particularly disadvantageous to the distance finder mainly powered by battery cells. In addition the laser distance finder is so sensitive that the current continuously provided to the motor will influence the measuring result and significantly reduce the measuring accuracy.

SUMMARY OF THE INVENTION

An object of the present invention is to overcome the disadvantages in the prior art to provide a power-saving laser distance finder with a reflective member which can be swiveled automatically.

The present invention provides a laser distance finder which comprises a laser generating device, a collimating lens positioned in an emitting end direction of the laser generating device for converting a laser beam generated from the laser generating device into a collimating measuring beam, a receiving lens for receiving a reflected measuring beam from an object to be measured and focusing it into an image, an optoelectronic detector disposed in the distance finder for receiving the reflected measuring beam, a reflective member rotatably mounted in an optical path of the collimating measuring beam via a rotating shaft and being capable of rotating to a first position and a second position. The rotating shaft is connected to an output shaft of a motor. The laser distance finder further comprises a spring, one end of which is connected to the reflective member and the other one end of which is fixedly mounted in the distance finder, and a maximum deformation position of the spring occurs between the first position and the second position.

With such a structure, the maximum deformation of the spring occurs when the rotating center of the rotating shaft and two ends of the spring are aligned. Once the motor drives the rotating shaft across the maximum deformation position, the reflective member will be forced to a desired position immediately just under an elastic force of the spring and be kept in that desired position. It is not necessary to supply power to the motor continuously to maintain the reflective member in the desired position as disclosed in the prior art. Utilizing different deformation status of the spring, the reflective member is driven to the desired position more rapidly and more exactly, which saves power.

BRIEF DESCRIPTION OF THE DRAWINGS

The present invention is described detailed in conjunction of the drawings.

DETAILED DESCRIPTION OF THE PREFERRED EMBODIMENTS

Figure 1:
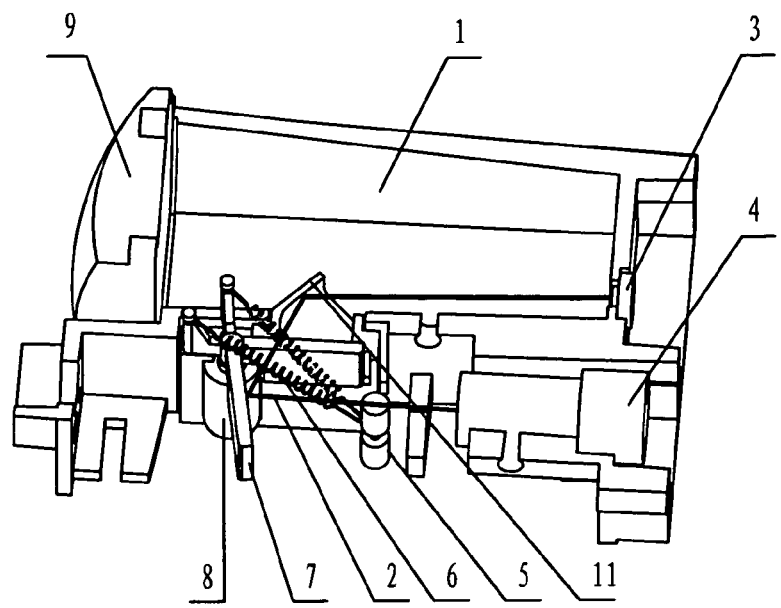
FIG. 1 is a perspective view of a preferred embodiment of the present invention.

In a laser distance finder of a preferred embodiment of the present invention shown in FIG. 1, a laser diode (LD) module 4 for emitting a collimating measuring beam 2 is fixedly mounted on a brace 1. A laser generating device is mounted in the LD module 4, and a collimating lens is disposed in an emitting end direction of the laser generating device. The laser generating device and the collimating lens can also be mounted on the brace directly. A receiving lens 9 disposed on one side of the LD module 4 is mounted at a front end of the brace 1, and an optoelectronic detector 3 located at an focus point of the receiving lens 9 is mounted at a back end of the brace 1. In the preferred embodiment, the receiving lens 9 is a convex lens, while in other embodiments the receiving lens 9 can be any other suitable lens. The optoelectronic detector 3 may be avalanche photodiode, or PIN photodiode, or other detecting elements or devices. In other embodiments, the laser generating device and the collimating lens can be disposed on the optical axis of the receiving lens 9.

Figure 2:
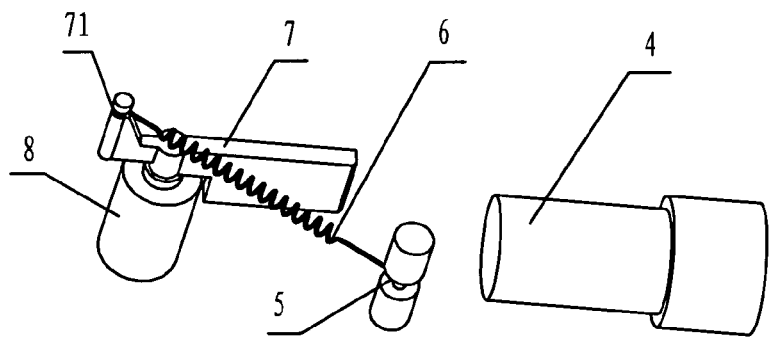
FIG. 2 is a perspective view of components related to a reflective member shown in FIG. 1.

In the preferred embodiment, a reflective member 7 is mounted on a transmission optical path of the collimating measuring beam 2. An intermediate part of the reflective member 7 acting as a rotating shaft for the reflecting member is connected to an output shaft of a motor 8. Referring to FIG. 2, a pin 71 is formed at one end of the reflective member 7, and a fixed pin 5 locates on a bisector line of an angle defined by two limit positions of the reflective member 7. A first end of an extension spring 6 is connected to the pin 71, while a second end of the extension spring is connected to the fixed pin 5.

Figure 3:
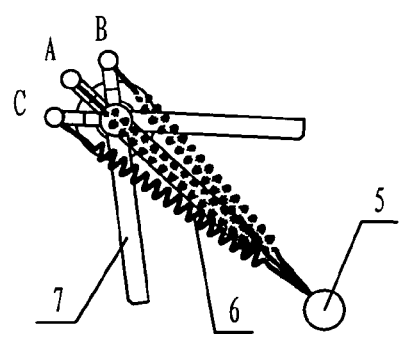
FIG. 3 is a schematic view showing different positions of the reflective member and related components shown in FIG. 1.

During the distance measuring process, the reflective member 7, which is driven by the motor 8, can be switched between a limit position C and a limit position B as shown in FIG. 3. The extension spring 6 has a maximum deformation when the reflective member 7 is in an initial position A where the two ends of the extension spring and the rotating center of the rotating shaft are aligned. Once the reflective member 7 is driven by the motor 8 across position A, it rotates rapidly by itself to a desired position, e.g., position C or position B, and is kept on the desired position under a restoring force of the extension spring. When the reflective member 7 is in position C, it is substantially parallel to the collimating measuring beam 2 so as to allow it to be projected out of the laser distance finder directly. When the reflective member 7 is in position B, it blocks the collimating measuring beam 2 to reflect it to a reflective mirror 11 located in the brace 1 so that the collimating measuring beam 2 is reflected again by the reflective mirror 11 to reach the optoelectronic detector 3, which forms an internal optical path.

When the reflective member 7 rotates to position B or position C, it can be kept in that position by the extension spring 6. Thus, it is not necessary to supply power to the motor continuously to maintain the reflective member 7 in that position, which avoids the current supplied to the motor affecting the accuracy of the distance measuring. When switching the positions of the reflective member, power is supplied to the motor again so that the reflective member can be driven by the motor to overcome the force of the extension spring providing the maximum deformation position of the extension spring.

Based on the same principle presented by the preferred embodiment, it can be understood easily that in other embodiments other parts of the reflective member can be used as a rotating shaft and connected to the output shaft of the motor. The rotating shaft can be connected to the output shaft of the motor by transmission means as well as connected with each other directly, and the extension spring can be replaced by a compression spring. In the present invention, the maximum deformation of the extension spring occurs on the position of the bisector line of the angle defined by position B and position C. It can be easily understood for those ordinary skilled in the art that the reflective member can be kept in position B or position C as long as the maximum deformation of the spring occurs at any position between position B and position C.

The above described preferred embodiments and the drawings are intended to illuminate the principle of the present invention, but not to limit its scope. It can be easily understood for those ordinary skilled in the art that many other modifications and variations of the preferred embodiments will be apparent and may be made without departing from the spirit and the scope of the invention as defined in the following claims.

I claim:

1. A laser distance finder, comprising:
a laser generating device;
a collimating lens positioned in an emitting end direction of the laser generating device for converting a laser beam generated from the laser generating device into a collimating measuring beam;
a receiving lens for receiving a reflected measuring beam from an object to be measured and focusing it into an image;
an optoelectronic detector for receiving the image from the reflected measuring beam;
a reflective member rotatably mounted on an optical path of the collimating measuring beam via a rotating shaft, the reflective being capable of rotating to a first position and a second position around the rotating shaft, the rotating shaft being connected to an output shaft of a motor;
a spring having a first end and a second end, the first end connected to the reflective member and the second one end fixedly mounted in the distance finder; and, wherein the spring has a maximum deformation position between the first position and the second position.

2. A laser distance finder as claimed in claim 1, wherein the optoelectronic detector locates at a focus point of the receiving lens.

3. A laser distance finder claimed in claim 1, wherein the rotating shaft of the reflective member is connected to the output shaft of the motor directly.

4. A laser distance finder as claimed in claim 1, wherein the spring is an extension spring.

5. A laser distance finder as claimed in claim 4, wherein the rotating shaft of the reflective member locates between a position where the spring is connected to the reflective member and a position where the spring is fixedly connected to the distance finder.

6. A laser distance finder as claimed in claim 1, wherein the spring has a maximum deformation position in a bisector line of an angle defined by the first position and the second position of the reflective member.

7. A laser distance finder as claimed in claim 6, wherein the rotating shaft of the reflective member is a part of the reflective member.

8. A laser distance finder, comprising:
a laser generating device;
a collimating lens positioned in an emitting end direction of the laser generating device for converting a laser beam generated from the laser generating device into a collimating measuring beam;
a receiving lens for receiving a reflected measuring beam from an object to be measured and focusing it into an image;
an optoelectronic detector for receiving the image from the reflected measuring beam;
a reflective member rotatably mounted on a rotating shaft of a motor,
a spring having a first end and a second end, wherein the first end is connected to the reflective member and the second end is fixedly mounted in the distance finder.

9. A laser distance finder of claim 8, wherein the reflective member is movable from an initial position between a first position and a second position based on a maximum deformation position of the spring.

10. A laser distance finder of claim 9 wherein the reflective member is held in one of the first position or the second position by the spring.

\* \* \* \* \*

UNITED STATES PATENT AND TRADEMARK OFFICE
CERTIFICATE OF CORRECTION

PATENT NO.         : 7,554,651 B2
APPLICATION NO. : 12/006567
DATED              : June 30, 2009
INVENTOR(S)        : Yuzhong Zhao It is certified that error appears in the above-identified patent and that said Letters Patent is hereby corrected as shown below:

On the Title Page, Item (73) should read,
Assignee: Chervon Limited, Hong Kong (HK)

Signed and Sealed this

Sixth Day of October, 2009

David J. Kappos
*Director of the United States Patent and Trademark Office*